United States Patent
Tsuchiya et al.

(10) Patent No.: US 10,263,250 B2
(45) Date of Patent: Apr. 16, 2019

(54) STABILIZED LITHIUM POWDER, AND NEGATIVE ELECTRODE AND LITHIUM ION SECONDARY BATTERY USING THE SAME

(71) Applicant: TDK CORPORATION, Tokyo (JP)

(72) Inventors: Masahiro Tsuchiya, Tokyo (JP); Tomohiko Hasegawa, Tokyo (JP); Kazuya Kai, Tokyo (JP); Atsushi Sano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 226 days.

(21) Appl. No.: 14/874,875

(22) Filed: Oct. 5, 2015

(65) Prior Publication Data

US 2016/0099465 A1 Apr. 7, 2016

(30) Foreign Application Priority Data

Oct. 3, 2014 (JP) ................................. 2014-204699
Aug. 27, 2015 (JP) ................................. 2015-167346

(51) Int. Cl.
*H01M 4/36* (2006.01)
*H01M 4/48* (2010.01)
*H01M 4/38* (2006.01)
*H01M 10/052* (2010.01)
*H01M 4/02* (2006.01)

(52) U.S. Cl.
CPC ........... *H01M 4/366* (2013.01); *H01M 4/382* (2013.01); *H01M 4/483* (2013.01); *H01M 10/052* (2013.01); *H01M 2004/027* (2013.01); *Y02T 10/7011* (2013.01)

(58) Field of Classification Search
CPC ...... H01M 4/366; H01M 4/483; H01M 4/382; H01M 10/052; H01M 2004/027
See application file for complete search history.

(56) References Cited

U.S. PATENT DOCUMENTS

| | | | |
|---|---|---|---|
| 5,567,474 A | 10/1996 | Dover et al. | |
| 2011/0104571 A1* | 5/2011 | Zhamu | H01B 1/122 429/231.95 |
| 2011/0165462 A1* | 7/2011 | Zhamu | H01M 4/134 429/223 |
| 2014/0134438 A1* | 5/2014 | Gadkaree | B22F 1/02 428/402.24 |
| 2014/0272567 A1* | 9/2014 | Zhang | H01M 4/364 429/212 |

FOREIGN PATENT DOCUMENTS

JP 2699026 B2 1/1998

* cited by examiner

*Primary Examiner* — Jonathan Crepeau
*Assistant Examiner* — Angela Martin
(74) *Attorney, Agent, or Firm* — Oliff PLC

(57) ABSTRACT

Stabilized lithium powder according to an embodiment of this disclosure includes lithium particles. Each lithium particle includes an inorganic compound on a surface thereof, the inorganic compound contains lithium hydroxide, and the lithium hydroxide is contained by 2.0 wt% or less relative to the entire stabilized lithium powder.

11 Claims, 2 Drawing Sheets

STABILIZED LITHIUM POWDER, AND NEGATIVE ELECTRODE AND LITHIUM ION SECONDARY BATTERY USING THE SAME

CROSS-REFERENCE TO RELATED APPLICATION

This application claims priority from Japanese Patent Application No. 2014-204699 filed with the Japan Patent Office on Oct. 3, 2014, the entire content of which is hereby incorporated by reference.

BACKGROUND

1. Technical Field

The present disclosure relates to stabilized lithium powder, a negative electrode using the stabilized lithium powder, and a lithium ion secondary battery using the stabilized lithium powder.

2. Related Art

An electrochemical device typified by a lithium ion secondary battery, whose positive electrode employs a lithium-containing transition metal oxide typified by lithium cobaltate and whose negative electrode employs a carbon material capable of being doped and de-doped with lithium, has a characteristic feature of high energy density. Due to this feature, such an electrochemical device is important as a power source for a portable electronic appliance typified by a mobile phone. Along with the rapid spread of the portable electronic appliances, the demand for the lithium ion secondary battery has been increasing.

A number of eco-friendly vehicles including hybrid vehicles have been developed. As a power source to be mounted on the hybrid vehicle, a lithium ion secondary battery with high energy density has attracted attention.

The capacity of the lithium ion secondary battery mainly depends on an electrode active material. As a negative electrode active material, graphite is typically used. To meet the above demand, however, it is necessary to use a negative electrode active material with higher capacity. In view of this, metal silicon (Si) with much higher theoretical capacity (4210 mAh/g) than that of graphite (372 mAh/g) has attracted attention.

One of the known means for improving the performance of the lithium ion secondary battery is a pre-doping technique. According to this technique, mainly the negative electrode of the lithium ion power storage device is doped with lithium ions in advance, so that the irreversible capacity of the electrode in the lithium ion power storage device can be suppressed.

For example, Japanese Patent No. 4126157 discloses a vertical pre-doping method in which a holed foil with a penetration hole is used as a current collector. In the vertical pre-doping method, in addition to a positive electrode and a negative electrode, a third electrode is used for supplying lithium ions to the positive electrode and the negative electrode.

A fabrication process with the vertical pre-doping method is more complicated than a normal fabrication process for the lithium ion power storage device, and therefore requires more time and cost for fabricating the device.

In another technique, a lithium foil is used for the entire positive electrode mixture layer and negative electrode mixture layer. However, lithium is so soft that it is very difficult to attach the lithium foil evenly on the electrode mixture layer. Moreover, it is difficult to handle the lithium foil in this work, so that the mass productivity may be affected.

To solve this problem, a method of using lithium powder has been suggested. According to this method, a solution including lithium powder is applied to perform pre-doping (see JP-A-2008-98151).

As such a pre-doping method employing the lithium powder, a method in which the lithium powder with low stability is stabilized has been developed. In an example of the method for stabilizing the lithium powder, stabilized lithium powder for a lithium ion secondary battery is used. This powder includes metal lithium particles each having a surface covered with a highly stable material. Examples of such a highly stable material include organic rubbers such as nitrile butadiene rubber (NBR) and styrene butadiene rubber (SBR), organic resins such as ethylene vinyl alcohol copolymer resin (EVA), polyvinylidene fluoride (PVDF), and polyether (PEO), and inorganic compounds such as metal compounds.

By using any of these stabilized lithium powder, the powder particles are stabilized in the air or in the solvent such as toluene or xylene. Further, the modification of lithium can be suppressed even in a dry room with a dew point of approximately −40° C. The excessive reaction between lithium and the negative electrode active material in the pre-doping is also suppressed. This can reduce the amount of heat generated by this reaction.

In the case where an organic polymer is used as a covering portion, however, the covering portion is eluted upon the exposure to the electrolyte solution in the battery. This may deteriorate the battery performance. In particular, under the high-temperature environment or high potential, the elusion of the covering portion and the reactivity are increased to make such influence remarkable. On the other hand, the safety and stability of the particles including the lithium metal covered with the inorganic compound such as lithium carbonate or lithium oxide are not sufficient yet.

SUMMARY

Stabilized lithium powder according to an embodiment of this disclosure includes lithium particles. Each lithium particle includes an inorganic compound on a surface thereof, the inorganic compound contains lithium hydroxide, and the lithium hydroxide is contained by 2.0 wt % or less relative to the entire stabilized lithium powder.

DETAILED DESCRIPTION

Figure 1:
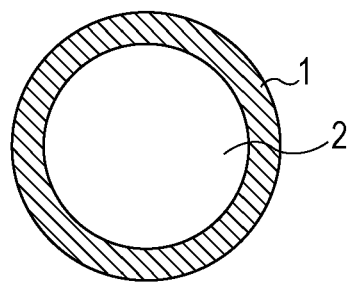
FIG. 1 is a schematic sectional view illustrating stabilized lithium powder according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In view of the above circumstances, an object of the present disclosure is to provide stabilized lithium powder that can improve the safety and productivity in the fabrication of an electrode while the battery performance is maintained.

The inventors have conducted extensive studies for improving the productivity by increasing the safety in the fabrication of the electrode while maintaining the battery performance. As a result, the inventors have found out that lithium hydroxide is produced as a by-product in or after the fabrication of the stabilized lithium powder for a lithium ion secondary battery. Lithium hydroxide is highly hydrophilic and thermally unstable. When lithium hydroxide is, for example, heated to produce lithium oxide, water is released. The reaction between the water and metal lithium may cause a drastic temperature increase. If lithium hydroxide turns into a hydrate, the hydrophilic property is further increased to cause the more drastic temperature increase. Further, lithium hydroxide has high basicity, and thus unexpected reaction may occur in the lithium ion secondary battery. Moreover, because of the corrosiveness, the battery performance may be deteriorated. In view of this, controlling the amount of lithium hydroxide is very important in providing the battery with excellent safety and productivity.

Stabilized lithium powder according to an embodiment of the present disclosure (hereinafter referred to as "stabilized lithium powder" as appropriate) includes lithium particles. The lithium particle has an inorganic compound on a surface thereof. The inorganic compound contains 2.0 wt % or less of lithium hydroxide relative to the entire stabilized lithium powder. With the stabilized lithium powder, the safety and productivity in the fabrication of the electrode can be improved.

The inorganic compound may further contain lithium oxide. Lithium oxide is less hydrophilic than lithium hydroxide. Lithium oxide contributes to the further stabilization of the lithium particles.

The negative electrode doped with lithium from the stabilized lithium powder has high safety and productivity. With the stabilized lithium powder, the electrode with excellent battery characteristics can be provided.

A lithium ion secondary battery including the negative electrode doped with lithium from the stabilized lithium powder, a positive electrode, and an electrolyte has the excellent battery characteristics due to the sufficient doping effect.

The stabilized lithium powder according to the present disclosure has the improved safety and productivity in the fabrication of the electrode. With the use of the stabilized lithium particles, the lithium ion secondary battery can be fabricated.

An embodiment of the present disclosure will be hereinafter described. The embodiment of the present disclosure is not limited to the embodiment described below.

(Stabilized Lithium Powder)

A lithium particle 2 included in stabilized lithium powder for a lithium ion secondary battery according to the embodiment includes an inorganic compound on a surface of the lithium particle 2. The inorganic compound can be formed to have a shape like a film or an island as a stabilized layer 1 as illustrated in FIG. 1. This stabilized layer 1 can be formed to cover the lithium particle 2 completely. The lithium particles may have an average particle size of 1 to 200 µm. In an example of a measurement method for stably measuring the stabilized lithium particles, an optical microscope, an electronic microscope and a particle size distribution analyzer can be used under an inert atmosphere such as inert gas or hydrocarbon oil.

The inorganic compound formed on the surface of the lithium particle can further include lithium oxide.

This stabilized lithium powder is easily handled, and can be even used in a dry room with a dew point of approximately −40° C.

The amount of lithium oxide included in the stabilized layer of the stabilized lithium powder may be of such a degree that the lithium oxide can cover the lithium particles. The amount of lithium oxide may be 1 wt % or more and 10 wt % or less, particularly 1.0 wt % or more and 5.0 wt % or less, relative to the entire weight of the stabilized lithium powder. When the amount of lithium oxide is in this range, the loss of the negative electrode due to the heat generation in the fabrication of the negative electrode can be reduced. Thus, the electrode with higher safety and productivity can be fabricated.

The ratio of the content of lithium hydroxide to the content of lithium oxide (lithium hydroxide/lithium oxide) may be 0.3 or more and 2 or less. The stabilized layer 1 with such a structure can provide the higher initial charging/discharging efficiency.

The stabilized layer of the stabilized lithium powder may include a compound other than lithium oxide. Examples of such a compound include lithium carbonate, lithium chloride, lithium acetate, lithium bromide, lithium nitrate, lithium sulfide, lithium sulfate, and lithium carbide. These may be stacked on the stabilized layer or dispersed in the stabilized layer.

The stabilized layer may contain a transition metal, particularly, Ni, Fe, Cr, Mn, Zr, Ti, or Al. If hydroxide ions are generated, such a metal forms a compound with the hydroxide ions to stabilize the reaction. This improves the reliability of the stabilized lithium powder. The transition metal may exist as single metal or as a compound. From the viewpoint of the stability of the compound, the transition metal may be a compound containing oxygen, such as an oxide. Further, the transition metal may be contained by $1.0 \times 10^{-3}$ mass % or more and $10.0 \times 10^{-3}$ or less relative to the entire stabilized lithium powder. The content of the transition metal can be obtained by ICP (Inductively Coupled Plasma).

The stabilized layer of the stabilized lithium may have any thickness such that the battery characteristics are not affected. The thickness of the layer is not necessarily constant.

The shape of a stabilized lithium powder particle may be spherical as illustrated in FIG. 1 or may be any other shape, for example, a shape that is not spherical but distorted shape.

In regard to the composition of the stabilized lithium metal powder, components can be quantified by using the quantification with the known solid-state LiNMR, the X-ray photoelectron spectrometry, the X-ray diffraction, or the like. For the analysis of a small amount of components, the solid-state NMR with high resolution solid NMR may be used. For example, the NMR spectrometer DSX 400 manufactured by Bruker may be used.

With the use of the negative electrode doped with lithium from the stabilized lithium powder, the loss of the negative electrode caused by the heat generation in the fabrication of the negative electrode can be reduced. The safety and productivity in the fabrication of the negative electrode can be improved. This electrode can have the excellent battery characteristics.

(Method for Fabricating Stabilized Lithium Powder)

The stabilized lithium powder according to the embodiment can be fabricated as below. The lithium metal is first heated in the hydrocarbon oil at a temperature of more than or equal to the melting point of the lithium metal. The obtained melted lithium is stirred at high speed. After that, under a particular condition, high-purity carbonate gas, hydrocarbon oil having higher temperature than the reaction solution, and a drying agent are added. This prevents the contact between the lithium powder and moisture. Thus, lithium hydroxide can be eliminated intentionally. In this manner, the stabilized lithium powder hardly containing hydroxide is fabricated. According to the embodiment of the present disclosure, other alkali metal powder such as powder of sodium or potassium can be similarly fabricated.

The metal lithium used as a raw material for the stabilized lithium powder according to the present disclosure may be any lithium in the state that can be used for the lithium ion secondary battery without any problem. Metal lithium with a shape of a rectangle, a particle, powder, and a foil can be used.

The hydrocarbon oil for fabricating the stabilized lithium powder according to the present disclosure may be any kind of hydrocarbon oil. The hydrocarbon oil used in the present specification mainly includes various kinds of oily liquid containing a hydrocarbon mixture. In other words, mineral oil, i.e., an oily product derived from minerals with a viscosity of such a degree that the product is regarded as oil, can be used. The hydrocarbon oil may be, for example, petroleum, shale oil, paraffin oil, or the like. The oily liquid included in the hydrocarbon oil, however, is not limited to the above. Typical examples of the hydrocarbon oil include: liquid paraffin (type S, and the industrial type) manufactured by Sanko Chemical Industry Co. Ltd.; products of MORESCO Corporation including MORESCO WHITE P-40, P-55, P-60, P-70, P-80, P-100, P-120, P-150, P-200, P-260, and P-350P; and products of KANEDA CORPORATION including HICALL M series (HICALL M-52, HICALL M-72, HICALL M-172, and HICALL M-352), HICALL K series (HICALL K-140N, HICALL K-160, HICALL K-230, HICALL K-290, and HICALL K-350) and HICALL E-7. In addition to the above, any purified hydrocarbon solvents that boil at a temperature of more than or equal to the melting point of lithium metal or sodium metal can be used.

When the lithium ingot is added by 1 part by weight, the amount of hydrocarbon oil may be 1 to 30 parts by weight, particularly 2 to 15 parts by weight from the viewpoint of the uniform dispersion after the melting.

The temperature after cooling the dispersion solution may be 100° C. or less, particularly 50° C. or less. The dispersion solution can be cooled gradually over one hour or more.

When the lithium ingot is added by 1 part by mass, carbon dioxide can be added to the dispersion mixture by 0.1 to 10 parts by mass, particularly 1 to 3 parts by mass. Carbon dioxide may be introduced under the surface of this mixture. For fabricating the dispersion solution, the stirring may be conducted sufficiently to such a degree that the dispersed metal lithium is brought into contact with carbon dioxide introduced onto the dispersion mixture.

The drying agent used in the fabrication of the stabilized lithium powder according to the present disclosure may be a drying agent that does not react with lithium. Examples of the applicable drying agent include 3A molecular sieves, 4A molecular sieves, 5A molecular sieves, aluminum oxide, silica gel, and magnesium oxide. The drying agent is not limited thereto and may be any other drying agent that does not react easily with alkali metal such as lithium and sodium.

The temperature at which the stabilized lithium powder according to the present disclosure is fabricated may be more than or equal to the temperature at which lithium metal is melted. This temperature is specifically 190° C. to 250° C., particularly 195° C. to 240° C., and more particularly 200° C. to 220° C. When the temperature is too low, the lithium is solidified, which makes it difficult to fabricate the lithium powder. When the temperature is too high, the gasification occurs depending on the boiling point of the hydrocarbon oil, which makes the handling in the fabrication difficult.

The stirring capability for fabricating the stabilized lithium powder according to the present disclosure depends on the size and process volume of the vessel. The particles can be made into microparticles usually using any stirring device, stirring machine, and dispersing machine employed in a stirring method for achieving the desired particle diameter.

In the fabrication of the stabilized lithium powder according to the present disclosure, high-purity carbonate gas can be used. The carbonate gas may have a concentration of 98% or more. Since the fabrication process includes the reaction with lithium metal, carbon dioxide with little moisture can be used. If carbon dioxide has low purity, the lithium metal possibly reacts with the impurities.

(Lithium Ion Secondary Battery)

The stabilized lithium powder described above is applied onto a negative electrode active material layer 24 formed on a negative electrode current collector 22. Thus, the negative electrode can be doped with lithium.

Figure 2:
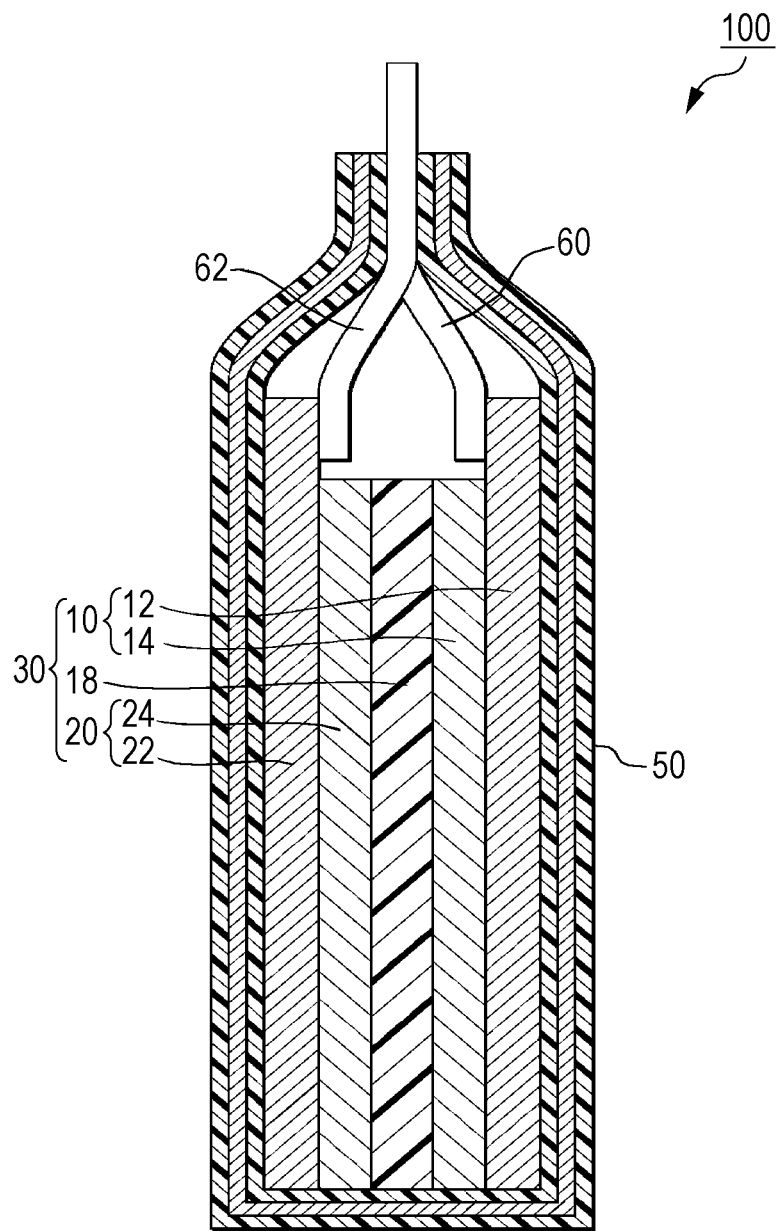
FIG. 2 is a schematic sectional view illustrating the lithium ion secondary battery according to the embodiment.

The negative electrode 20 doped with lithium, a positive electrode 10, and a separator 18 impregnated with the electrolyte are assembled as illustrated in FIG. 2, thereby fabricating a lithium ion secondary battery 100. The positive electrode 10 can be fabricated by forming a positive electrode active material layer 14 on a positive electrode current collector 12. In the drawing, a leading electrode for the positive electrode and a leading electrode for the negative electrode are denoted by 60 and 62, respectively.

Stabilized lithium powder according to the present invention is not limited to uses for a lithium-ion secondary battery and can be applied to electrochemical devices such as a lithium-ion capacitor, EDLC (Electric Double Layer Capacitor), etc.

EXAMPLES

The present embodiment will be more specifically described with reference to Examples and Comparative Examples. The present embodiment is, however, not limited by the examples below.

Example 1

Under the dry argon atmosphere, 10 g of commercially-available lithium metal was input into a stainless steel flask reactor at room temperature. The reactor was installed so that the thermal control thereof was possible by an oil bath. Into the reactor, 50 g of liquid paraffin HICALL K-290 (KANEDA CORPORATION) was added. Next, the reactor was heated up to approximately 200° C. using a hot stirrer and stirred using a stirring machine. It was visually confirmed that the metal was melted. Next, the stirring machine was used for the intensive stirring, thereby making the lithium powder into microparticles. After that, the stirring was conducted at high speed while the temperature was increased by approximately 20° C., and high-purity carbonate gas was introduced for one minute at a speed of 100 ml/min. After the gas was introduced, the stirring and the heating were stopped. Subsequently, 10 g of HICALL K-290 heated to have a temperature 30° C. higher than that of the reaction solution and 5 g of the commercially-available 3A molecular sieve were input into the reactor. Then, the mixture was stirred softly until the temperature thereof was decreased to approximately 45° C. Next, the mixture of lithium and HICALL K-290 floating above in the dispersion solution was put into a beaker. The mixture in the beaker was filtrated and washed with hexane three times, thereby removing the hydrocarbon oil medium. The filtrate was dried in an oven with the argon atmosphere, thereby removing a very small amount of solvent. The resulting stabilized lithium powder with free fluidity was put into a storage bottle.

The composition of the stabilized lithium powder was measured using the X-ray diffraction and the lithium solid-state NMR. According to the result, lithium hydroxide was contained by 2.0 wt % relative to the entire stabilized lithium powder. Moreover, it was clarified that lithium oxide was contained by 1.0 wt %, the lithium metal was contained by 96.0 wt %, and the other components were contained by 1.0 wt %.

<Fabrication of Lithium-Doped Active Material>

With the stabilized lithium powder, the lithium-doped active material was fabricated through the procedure as below in a dry room with a dew point of −50° C. to −40° C. As the electrolyte solution, $LiPF_6$ solution of 1 M (solvent: ethylene carbonate/diethyl carbonate=3/7 (volume ratio)) was prepared. Into 50 parts by mass of this electrolyte solution, 100 parts by mass of the negative electrode active material (SiO) and 7 parts by mass of the stabilized lithium powder were added. By stirring the obtained mixture for 24 hours at room temperature using a magnetic stirrer, the negative electrode active material was brought into electric contact with the stabilized lithium powder. This makes the negative electrode active material doped with lithium from the stabilized lithium powder (doping step). After the obtained active material was washed with diethyl carbonate, the material was dried in vacuum. Thus, the lithium-doped active material was obtained.

<Fabrication of Negative Electrode>

A slurry for forming the active material layer was prepared by mixing 83 parts by mass of the lithium-doped active material fabricated as above, 2 parts by mass of acetylene black as a conductive auxiliary agent, 15 parts by mass of polyamide-imide as a binder, and 82 parts by mass of N-methylpyrrolidone as a solvent. This slurry was applied on one surface of a 14-μm-thick copper foil as a current collector so that the lithium-doped active material was applied by 2.0 mg/cm². The slurry on the current collector was dried at 100° C., thereby forming the negative electrode active material layer. After that, roll-pressing was conducted for forming the negative electrode active material layer on the current collector through the pressure molding. Next, heat treatment was conducted in vacuum at 350° C. for three hours, thereby forming the negative electrode with the active material layer having a thickness of 22 μm.

<Productivity Check Test>

Based on the procedure for fabricating a negative electrode as described above, 30 pieces of negative electrodes were fabricated. In the process, a drastic temperature increase of 100° C./s or more happened. The number of lost electrodes is shown in Table 1.

<Fabrication of Lithium Ion Secondary Battery for Evaluation>

The negative electrode fabricated as above, a counter electrode where a lithium metal foil was attached to a copper foil as the positive electrode, and a separator formed of a polyethylene microporous film held between the negative electrode and the positive electrode were input into an aluminum laminated pack. Into the aluminum laminated pack, a $LiPF_6$ solution of 1 M (solvent: ethylene carbonate (EC)/diethyl carbonate (DEC)=3/7 (volume ratio)) was poured as the electrolyte solution. Then, the aluminum laminated pack was sealed to vacuum, thereby fabricating the lithium ion secondary battery for evaluation.

<Measurement of Initial Charging/Discharging Efficiency>

With the secondary battery charge/discharge system (manufactured by HOKUTO DENKO CORPORATION), the lithium ion secondary batteries for evaluation fabricated according to Examples and Comparative Examples were charged and discharged. The charging and discharging were conducted with a voltage ranging from 0.005 V to 2.5 V and at a current of 0.05 C (1 C=1600 mAh/g). Thus, the initial charging capacity, the initial discharging capacity, and the initial charging/discharging efficiency were obtained. The initial charging/discharging efficiency (%) corresponds to the ratio of the initial discharging capacity relative to the initial charging capacity (100=initial discharging capacity/initial charging capacity). As this initial charging/discharging efficiency is higher, the irreversible capacity is reduced. The high initial charging/discharging efficiency indicates that the excellent doping effect has been achieved. The results are shown in Table 1.

Example 2

Stabilized lithium powder containing the composition of Example 2 shown in Table 1 was prepared in the same manner as that of Example 1, except that the amount of 3A molecular sieve was changed to 7 g. The stabilized lithium powder was subjected to the productivity check test and the measurement of the initial charging/discharging efficiency, and the results were favorable. The composition of the stabilized lithium powder was measured using the X-ray diffraction and the lithium solid-state NMR. According to the results, lithium hydroxide was contained by 1.0 wt % relative to the stabilized lithium powder. Moreover, lithium oxide was contained by 1.0 wt % and the lithium metal was contained by 98.0 wt %.

Example 3

Stabilized lithium powder containing the composition according to Example 3 in Table 1 was prepared in the same manner that of Example 1, except that the time of introducing the high-purity carbonate gas was 1.4 times and 7 g of 3A molecular sieve was added. The obtained stabilized lithium powder was subjected to the productivity check test and the measurement of the initial charging/discharging efficiency, and the results were favorable. The composition of the stabilized lithium powder was measured using the X-ray diffraction and the lithium solid-state NMR. According to the results, lithium hydroxide was contained by 1.0 wt % relative to the entire stabilized lithium powder. Moreover, lithium oxide was contained by 2.0 wt % and the lithium metal was contained by 97.0 wt %.

Example 4

Stabilized lithium powder containing the composition of Example 4 in the table was prepared in the same manner as that of Example 1, except that the time of introducing the high-purity carbonate gas was doubled and 15 g of HICALL K-290 that was heated to have a temperature 30° C. higher than that of the reaction solution and 8 g of 3 A molecular sieve were added. The obtained stabilized lithium powder was subjected to the productivity check test and the measurement of the initial charging/discharging efficiency, and the results were favorable. The composition of the stabilized lithium powder was measured using the X-ray diffraction and the lithium solid-state NMR. According to the results, lithium hydroxide was contained by 1.0 wt % relative to the entire stabilized lithium powder. Moreover, lithium oxide was contained by 3.0 wt % and the lithium metal was contained by 96.0 wt %.

Example 5

Stabilized lithium powder containing the composition of Example 5 in the table was obtained in the same manner as that of Example 1, except that the time of introducing the high-purity carbonate gas was 2.5 times and 18 g of HICALL K-290 that was heated to have a temperature 30° C. higher than the reaction solution and 10 g of 3 A molecular sieve were added. The obtained stabilized lithium powder was subjected to the productivity check test and the measurement of the initial charging/discharging efficiency, and the results were favorable. The composition of the stabilized lithium powder was measured using the X-ray diffraction and the lithium solid-state NMR. According to the results, lithium hydroxide was not detected. It turned out that the content of lithium hydroxide was less than 1.0 wt %, which is the detection limit or less, relative to the entire stabilized lithium powder.

Example 6

Stabilized lithium powder containing the composition of Example 6 in the table was prepared in the same manner as that of Example 1, except that the time of introducing the high-purity carbonate gas was 3.5 times and 20 g of HICALL K-290 that was heated to have a temperature 30° C. higher than the reaction solution and 12 g of 3 A molecular sieve were added. The obtained stabilized lithium powder was subjected to the productivity check test and the measurement of the initial charging/discharging efficiency, and the results were favorable. The composition of the stabilized lithium powder was measured using the X-ray diffraction and the lithium solid-state NMR. According to the results, lithium hydroxide was not detected. It turned out that the content of lithium hydroxide was less than 1.0 wt %, which is the lower detection limit or less, relative to the entire stabilized lithium powder.

Examples 7 to 9

Stabilized lithium powder according to Examples 7 to 9 was obtained under the same condition as that of Example 1, except that the commercially-available Fe powder was added at a concentration shown in Table 2 at the same time as the supply of carbon dioxide. With the use of the obtained stabilized lithium powder, 30 pieces of negative electrodes were fabricated through the same procedure as that of Example 1. To check the safety of the negative electrodes, the acceleration test was conducted under a condition of 50° C. Table 2 shows the number of electrodes lost due to the drastic temperature increase of 100 ° C./s or more in the process. The initial charging/discharging efficiency was also measured using the same method as that of Example 1 and the results are shown in Table 2.

The above results have proved that the samples of Examples 7 to 9 were the stabilized lithium powder with excellent stability, i.e., excellent productivity.

Comparative Example 1

Stabilized lithium powder according to Comparative Example 1 was prepared by the procedure below, and the process is similar to the process described in Example 1 according to Japanese Patent No. 2699026. First, 300 g of lithium metal was input into a stainless steel vessel in the presence of argon in the dry atmosphere. Into the vessel, 2 g of sodium metal and 90%-Peneteck hydrocarbon oil were added. While the obtained mixture was heated, the mixture was stirred at a high speed of 10000 rpm at 200° C. On this occasion, carbon dioxide was introduced for 5 minutes while the stirring was continued. After that, the reaction solution was cooled down to 65° C. The cooled lithium dispersion solution was filtered using a glass wool filtering device. The obtained filtrate was washed with hexane, thereby providing the stabilized lithium powder fabricated through the conventional process. With the use of this stabilized lithium powder, the productivity check test was conducted. According to the results, five electrodes were lost due to the heat generated after the pressing, so that some batteries were not fabricated.

Comparative Example 2

The commercially-available lithium powder with the surface not having the stabilized layer of the inorganic compound was subjected to the productivity check test. According to the results, all the electrodes were lost due to the heat generated after the pressing. Thus, these electrodes were not used for fabricating the battery.

Comparative Example 3

Stabilized lithium powder containing the composition according to Comparative Example 3 in the table was prepared in the same manner as that of Example 1, except that the time of introducing the high-purity carbonate gas was shortened to a half and the temperature was set to 190° C. According to the results of the productivity check test, three electrodes were lost due to the heat generated after the pressing. Therefore, some batteries were not fabricated.

TABLE 1

|  | Lithium hydroxide (wt %) | Lithium oxide (wt %) | lithium hydroxide/ lithium oxide ratio | Productivity check test | Initial charging/ discharging efficiency |
|---|---|---|---|---|---|
| Example 1 | 2.0 | 1.0 | 2.0 | 0 loss | 86 |
| Example 2 | 1.0 | 1.0 | 1.0 | 0 loss | 88 |
| Example 3 | 1.0 | 2.0 | 0.5 | 0 loss | 90 |
| Example 4 | 1.0 | 3.0 | 0.3 | 0 loss | 85 |
| Example 5 | less than 1.0 | 5.0 | <<0.2 | 0 loss | 84 |
| Example 6 | less than 1.0 | 10.0 | <<0.1 | 0 loss | 80 |
| Comparative Example 1 | 4.0 | 1.0 | 4.0 | 5 losses | 60 |
| Comparative Example 2 | — | — | — | 30 losses | — |
| Comparative Example 3 | 3.0 | 1.0 | 3.0 | 3 losses | 65 |

TABLE 2

| | Fe content [10-3 mass %] | Productivity check test | Initial charging/discharging efficiency [%] |
|---|---|---|---|
| Example 1 | 0.0 | 0 loss | 86 |
| Example 7 | 1.0 | 0 loss | 87 |
| Example 8 | 2.0 | 0 loss | 88 |
| Example 9 | 9.7 | 0 loss | 88 |

The stabilized lithium powder for a lithium ion secondary battery according to the embodiment of the present disclosure may be any of the following first to third stabilized lithium powder for a lithium ion secondary battery.

The first stabilized lithium powder for a lithium ion secondary battery is stabilized lithium powder including lithium particles, wherein the lithium particle includes an inorganic compound on a surface thereof and lithium hydroxide is contained in the inorganic compound by 2.0 wt % or less relative to the entire stabilized lithium powder.

The second stabilized lithium powder for a lithium ion secondary battery is the first stabilized lithium powder for a lithium ion secondary battery, wherein the inorganic compound further contains lithium oxide.

The third stabilized lithium powder for a lithium ion secondary battery is the second stabilized lithium powder for a lithium ion secondary battery, wherein the lithium oxide is contained by 1 wt % or more and 10 wt % or less relative to the entire stabilized lithium powder.

The negative electrode for a lithium ion secondary battery according to the embodiment of the present disclosure is doped with lithium from any of the first to third stabilized lithium powder.

The lithium ion secondary battery according to the embodiment of the present disclosure includes the negative electrode doped with lithium from any of the first to third stabilized lithium powder, a positive electrode, and an electrolyte.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. Stabilized lithium powder, comprising
   lithium particles, and
   a stabilized layer formed on a surface of each of the lithium particles, the stabilized layer comprising:
      an inorganic composition containing lithium hydroxide in an amount of 2.0 wt % or less relative to a total amount of the stabilized lithium powder, and
      Fe in an amount in a range of from $1.0 \times 10^{-3}$ mass % to $10.0 \times 10^{-3}$ mass % relative to the total amount of the stabilized lithium powder.

2. The stabilized lithium powder according to claim 1, wherein the inorganic composition further contains lithium oxide.

3. The stabilized lithium powder according to claim 2, wherein the lithium oxide is contained in an amount of 1 wt % or more and 10 wt % or less relative to the total amount of the stabilized lithium powder.

4. A negative electrode, the negative electrode being doped with lithium from the stabilized lithium powder according to claim 1.

5. A negative electrode for a lithium ion secondary battery, the negative electrode being doped with lithium from the stabilized lithium powder according to claim 2.

6. A negative electrode for a lithium ion secondary battery, the negative electrode being doped with lithium from the stabilized lithium powder according to claim 3.

7. A lithium ion secondary battery comprising:
   the negative electrode according to claim 4;
   a positive electrode; and
   an electrolyte.

8. A lithium ion secondary battery comprising:
   the negative electrode according to claim 5;
   a positive electrode; and
   an electrolyte.

9. A lithium ion secondary battery comprising:
   the negative electrode according to claim 6;
   a positive electrode; and
   an electrolyte.

10. The stabilized lithium powder according to claim 1, wherein Fe is present in the stabilized lithium powder as a single metal or as a compound containing oxygen.

11. The stabilized lithium powder according to claim 1, wherein Fe is present in an amount in a range of from $1.0 \times 10^{-3}$ mass % to $9.7 \times 10^{-3}$ mass % relative to the total amount of the stabilized lithium powder.

* * * * *